(12) United States Patent
Towery et al.

(10) Patent No.: US 6,896,505 B2
(45) Date of Patent: May 24, 2005

(54) SYSTEM FOR REMOVABLY MOUNTING MODULES IN AN INJECTION MOLDING PRESS

(75) Inventors: Donald E. Towery, St. Petersburg, FL (US); Frank Meola, St. Petersburg, FL (US)

(73) Assignee: Modular Molding International, Inc., Largo, FL (US)

( * ) Notice: Subject to any disclaimer, the term of this patent is extended or adjusted under 35 U.S.C. 154(b) by 84 days.

(21) Appl. No.: 10/183,245

(22) Filed: Jun. 27, 2002

(65) Prior Publication Data

US 2004/0001901 A1 Jan. 1, 2004

(51) Int. Cl.[7] .............................................. B29C 45/17
(52) U.S. Cl. ....................... 425/190; 425/185; 425/186
(58) Field of Search ................................ 425/190, 182, 425/185, 186, 191

(56) References Cited

U.S. PATENT DOCUMENTS

| | | | | |
|---|---|---|---|---|
| 4,202,522 A | * | 5/1980 | Hanas et al. ................ | 249/102 |
| 4,793,785 A | * | 12/1988 | Osada ......................... | 425/116 |
| 5,096,410 A | * | 3/1992 | Loulourgas | |
| 5,108,278 A | * | 4/1992 | Tsutsumi et al. ........... | 425/116 |
| 5,562,935 A | * | 10/1996 | Martin ........................ | 425/552 |
| 5,662,946 A | * | 9/1997 | Pratt et al. .................. | 425/190 |
| 6,065,950 A | * | 5/2000 | Spiess ......................... | 425/11 |
| 6,328,552 B1 | * | 12/2001 | Hendrickson et al. ...... | 425/188 |

* cited by examiner

Primary Examiner—Benjamin L. Utech
Assistant Examiner—Emmanuel S. Luk
(74) Attorney, Agent, or Firm—Larson & Larson, PA; Herbert W. Larson

(57) ABSTRACT

Each inside surface of an injection molding press is attached to a static frame and ejector frame, respectively. The static frame is attached to a removable static mold assembly and the ejector frame is attached to a removable ejector frame assembly. The static mold assembly consists of a static cavity mold housing removably attached to a back plate. The ejector frame assembly consists of an ejector cavity mold housing removably attached to an ejector back plate assembly. The system only requires a change in the static and ejector cavity mold housing when changing molds for different plastic components. The static mold assembly and ejector mold assembly is attached by a yoke in a runner bar slot in a front portion of each respective static and ejector frame.

16 Claims, 23 Drawing Sheets

SYSTEM FOR REMOVABLY MOUNTING MODULES IN AN INJECTION MOLDING PRESS

BACKGROUND OF THE INVENTION

This invention relates to a system for molding plastic parts. More particularly, it refers to a system for locking molding modules in a reusable modular frame mounted in an injection molding press.

Typically, prior art systems for molding plastic components in an injection molding press require the creation of an expensive two component mold with a frame for each expected product. A liquid stream of plastic is injected into passageways in the mold cavity to form the expected product. After the cavity area is cooled, the expected product is ejected from the mold. In an attempt to reduce the cost of molds, a system for reducing mold building time has been sought. However, mold manufacture still requires the construction of costly frames for each mold. A system is needed where a single standard frame can be employed for several identical molds so that a mold module can be quickly interchanged with a different mold module when cavity molding requirements change. The removal of the need to alter the frame for holding the mold for each new molding job would dramatically reduce the startup costs in an injection molding system.

SUMMARY OF THE INVENTION

The present invention is a system for standardizing mold frames so that the only added cost in a new molding operation merely would be the cost of forming the front end cavity housing for the desired molded product. This is accomplished by the assembly of a static and ejector frame and standard molding assembly in a molding press providing a source of liquid polymer. Thereafter, cavity mold housings for both the static and ejector assemblies are formed containing apertures for receipt of the liquid polymer. The cavity mold housing for the static and ejector assembly is attached to a back plate and ejector back plate assembly, respectively to form the static assembly and ejector assembly. Multiple static and ejector assemblies are removably mounted to the static and ejector frames. No other component needs to be changed for producing a new plastic part.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
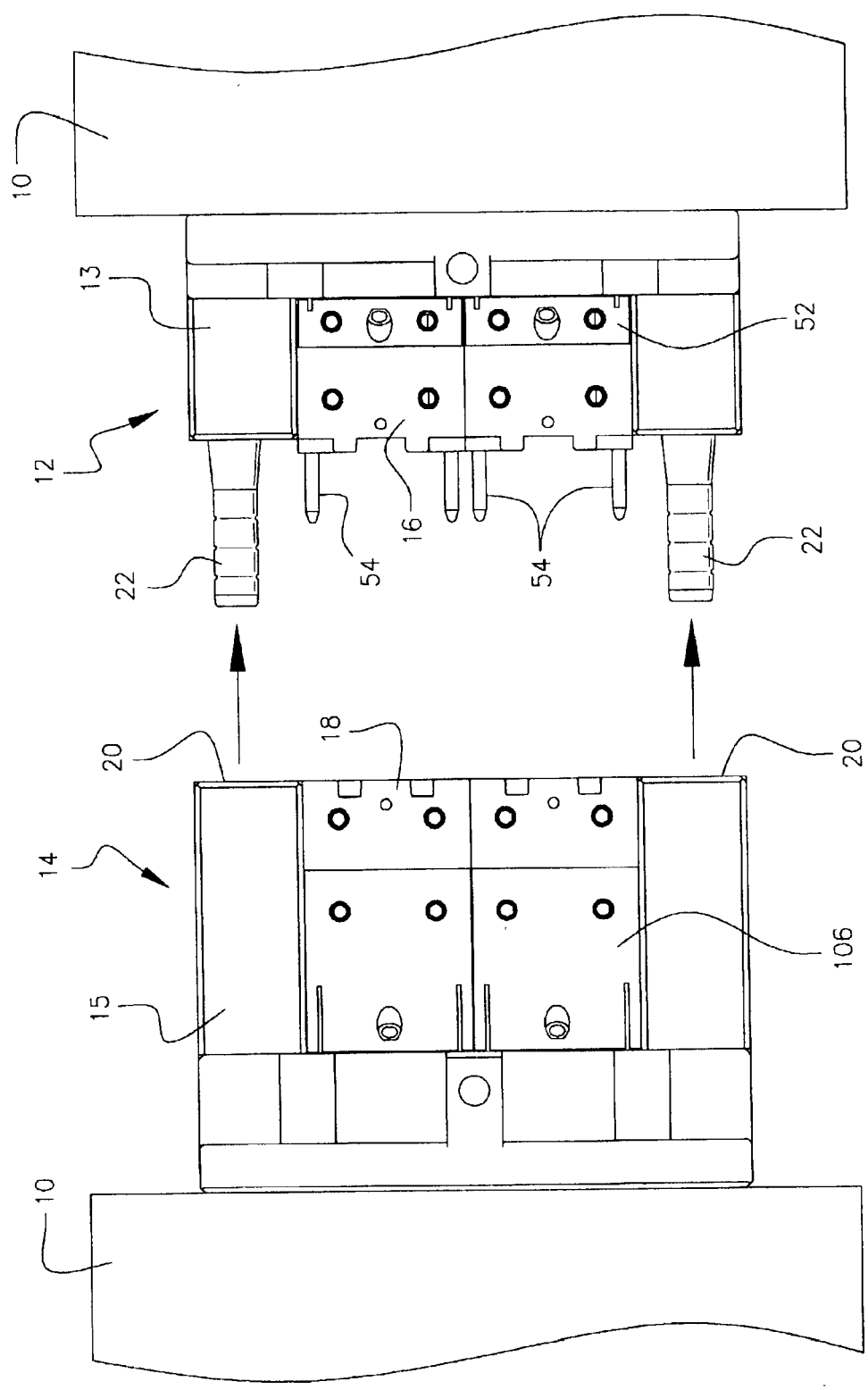
FIG. 1 is a side view in elevation of the molding system.

Throughout the following detailed description, the same reference numerals refer to the same elements in all figures.

Referring first to FIG. 1, there is shown a side view in elevation of the molding system including the molding press 10, the static frame 12 with top clamp assembly 13 and ejector frame 14 with bottom clamp assembly 15. At the front of the static frame 12 are the static cavity mold housings 16 and at the front of the ejector frame 14 are the ejector cavity mold housings 18. Bores 20 on the ejector frame 14 receive the interlock pins 22 from the static frame 12 as the ejector frame 14 is moved towards the static frame 12.

Figure 2:
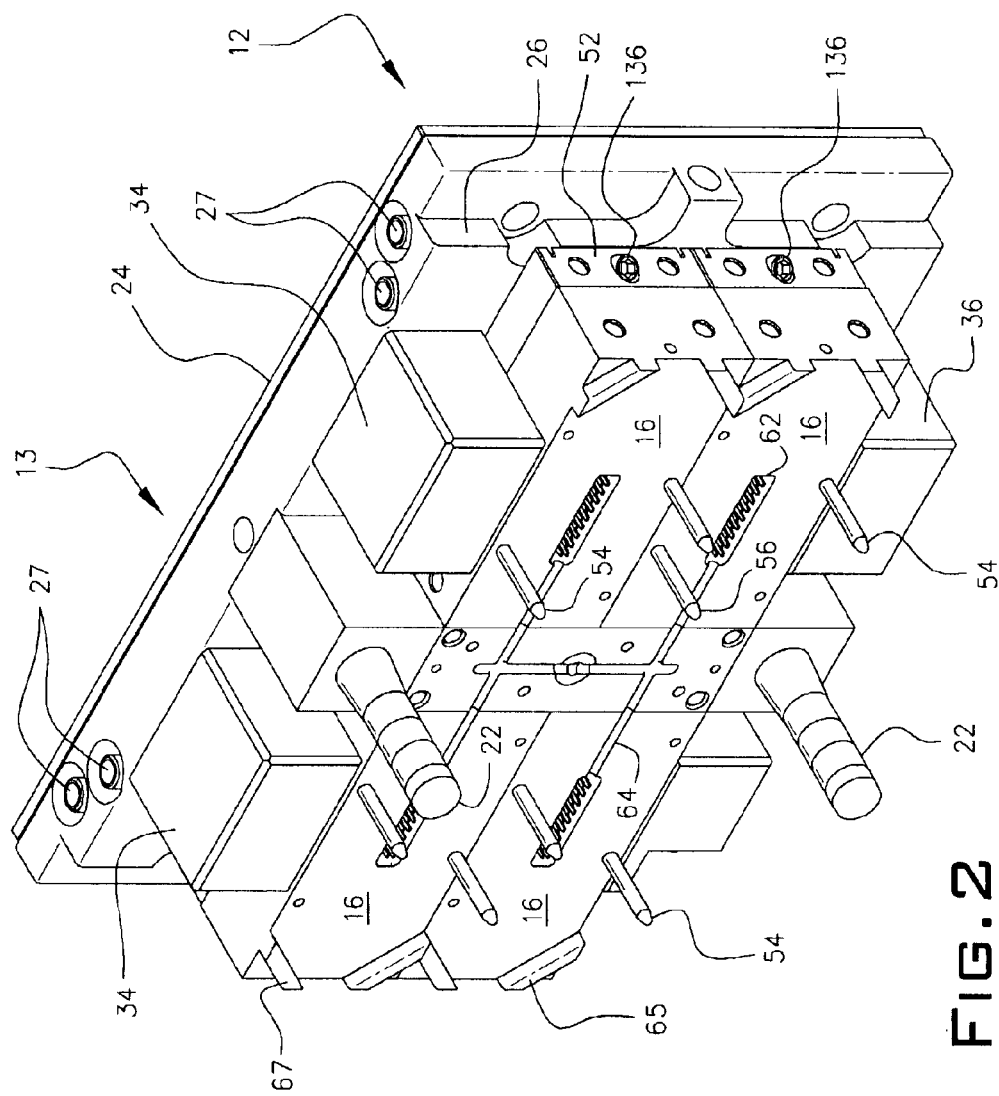
FIG. 2 is a perspective view of the static frame with four 3×6 static assemblies locked in position.
Figure 8:
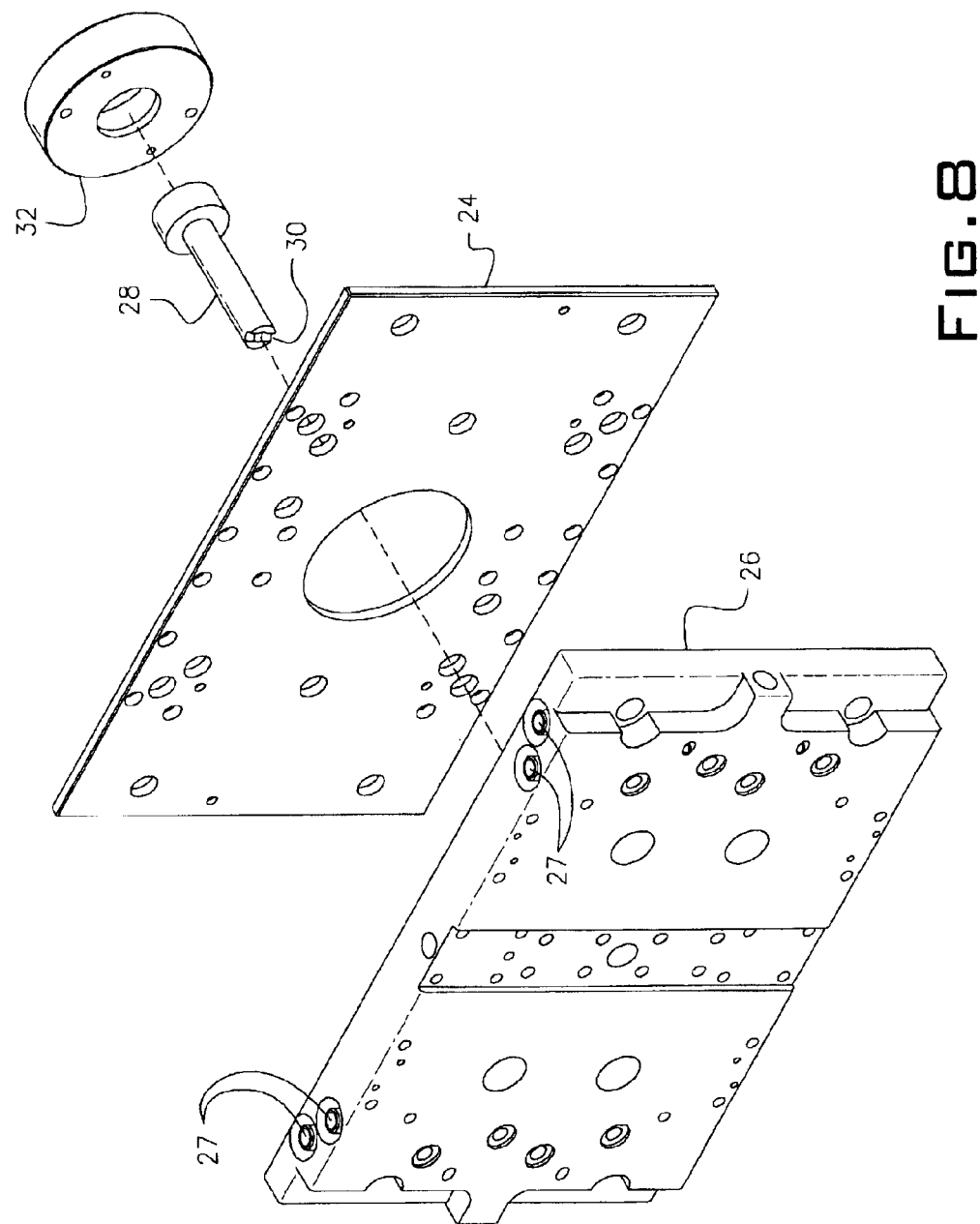
FIG. 8 is an exploded view showing the assembly of the back section of the static frame of the molding system.
Figure 9:
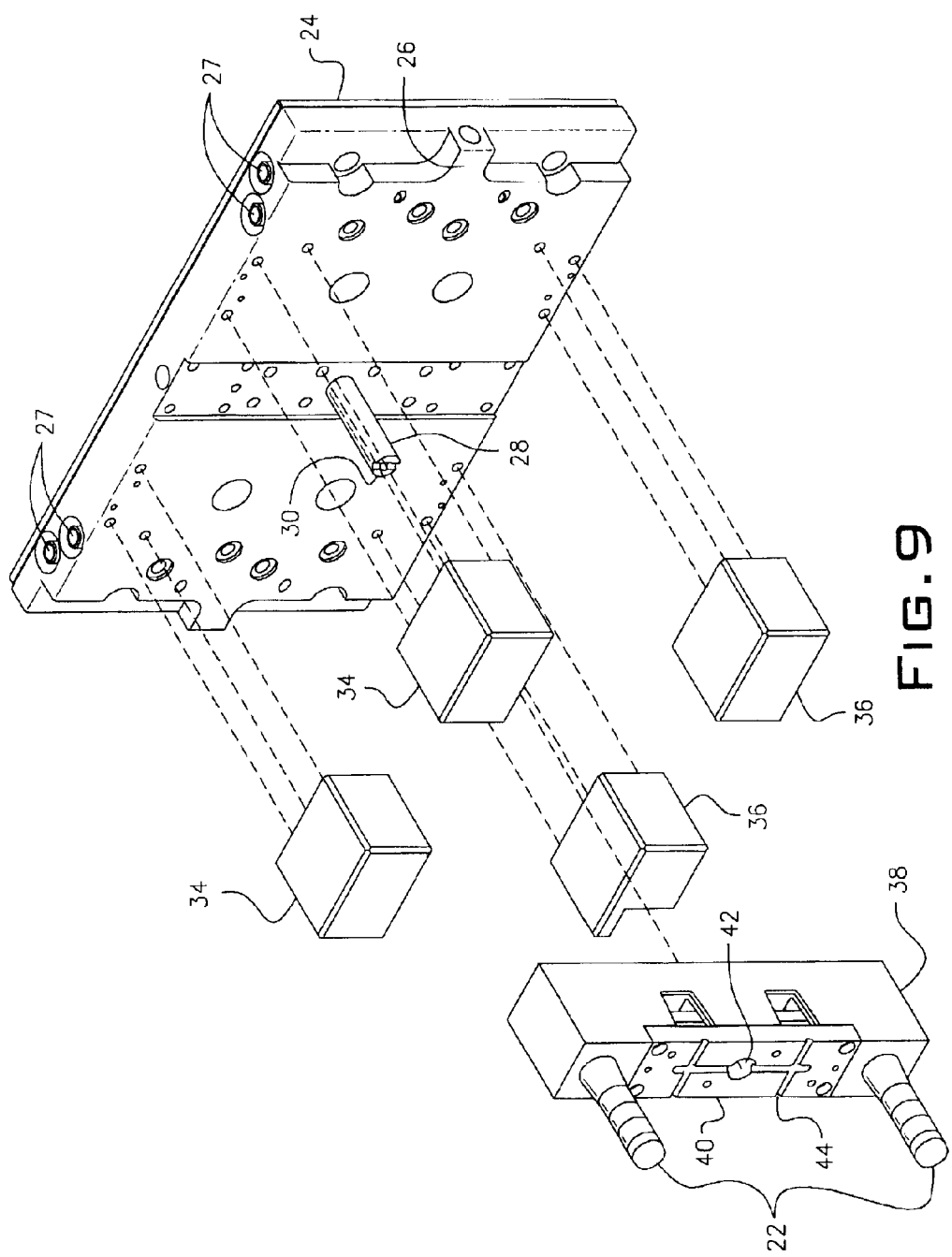
FIG. 9 is an exploded view showing the assembly of the intermediate section of the static frame of the molding system.

Referring to FIG. 2, the static frame 12 has four static frame assemblies mounted in the front of the static frame 12. Each static cavity mold housing 16 is screwed to a back plate 52. The static cavity mold housing 16 attached to the back plate 52 constitutes the static plate assembly. An insulated plate 24 supports the back of the static frame 12 and in front of the insulator plate 24 is a top clamp plate 26. The top clamp plate 26 contains water cooling tubes 27. As shown in FIG. 9, the top clamp plate supports a sprue bushing 28. A front portion 30 of the sprue bushing includes an opening through which molten plastic flows. As shown in FIG. 8, a back portion of the sprue bushing 28 has a locator ring 32. A pair of return pin towers 34 are attached to the front of the top clamp plate 26 and a pair of module supports 36 are attached to a bottom portion of the top clamp plate 26. The sprue bushing 28 fits into the back of a runner bar 38. The runner bar 38 has a pair of interlock pins 22 projecting out of the front end and has a runner bar insert 40 at its front end. The runner bar insert 40 has an opening 42 which is aligned with the front of the sprue bushing 30 so that molten plastic can flow into channels 44.

Figure 7:
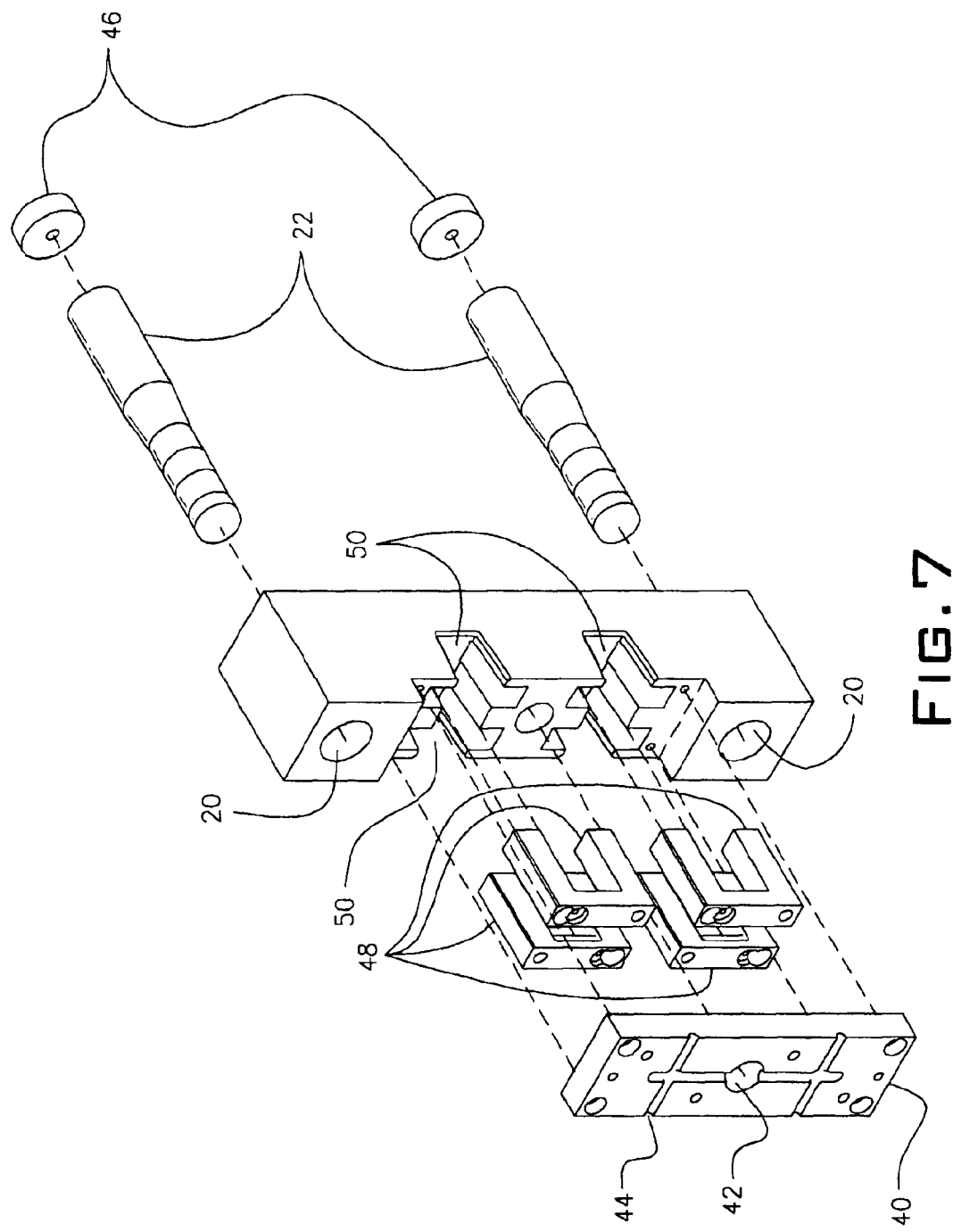
FIG. 7 is an exploded view showing the assembly of the front section of the static frame of the molding system.

As shown in FIG. 7, the runner bar 40 has through bores 20 for receipt of interlock pins 22 which have a pin cap 46 at their rear end. Locking key yokes 48 fit into slots 50 in the runner bar 40.

Figure 5:
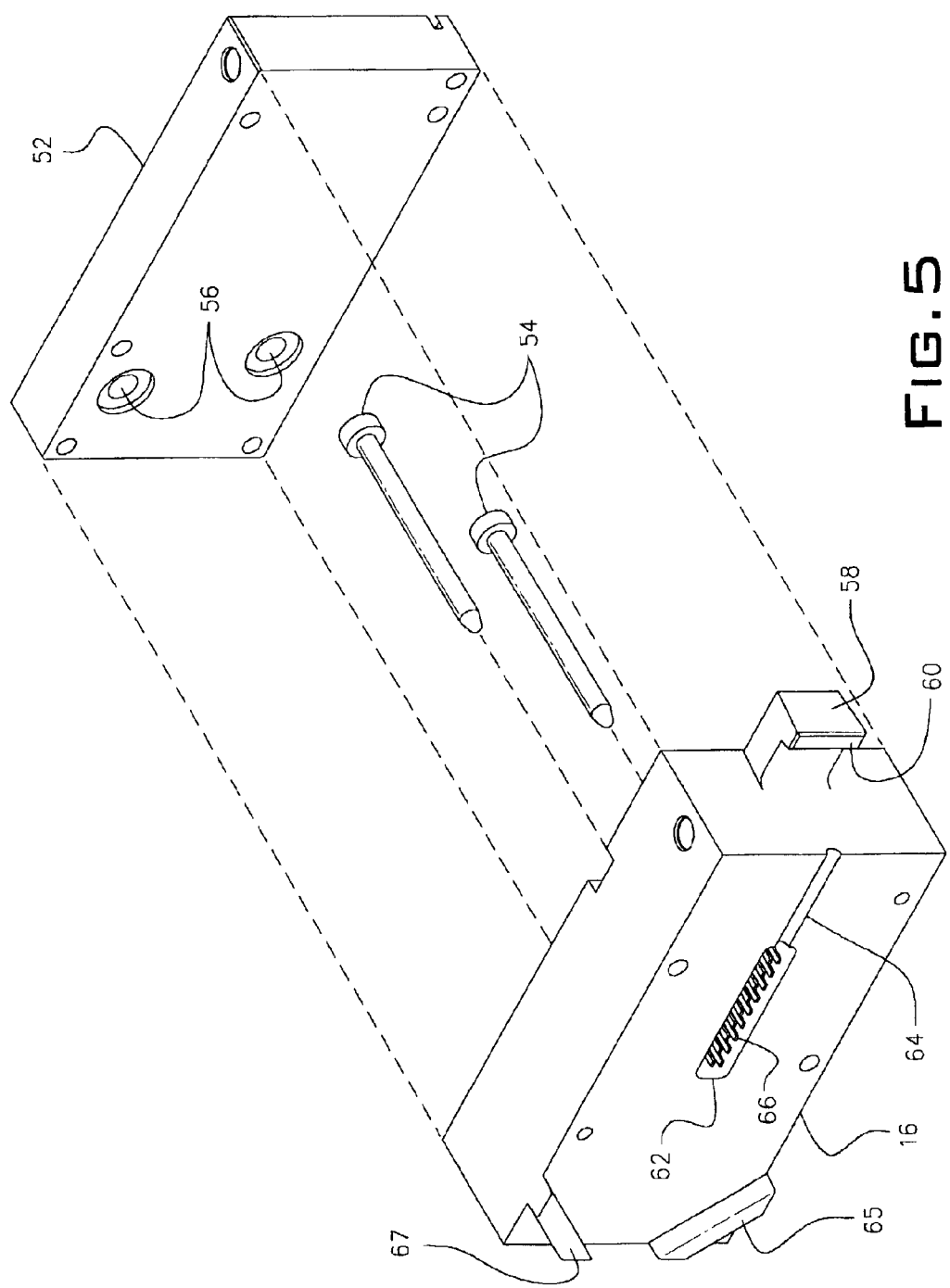
FIG. 5 is an exploded view showing the parts of the static mold assembly.
Figure 21A:
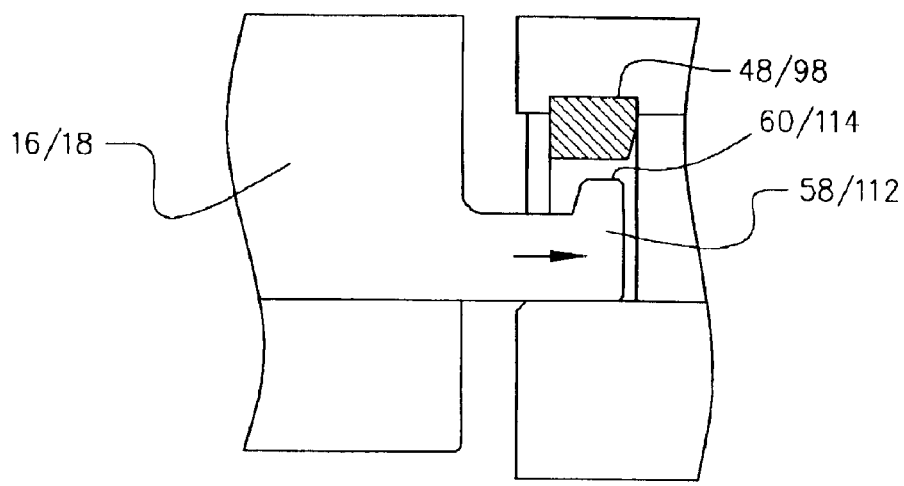
FIGS. 21A–C are elevational side views of a mold assembly being internally locked to the frame.
Figure 21B:
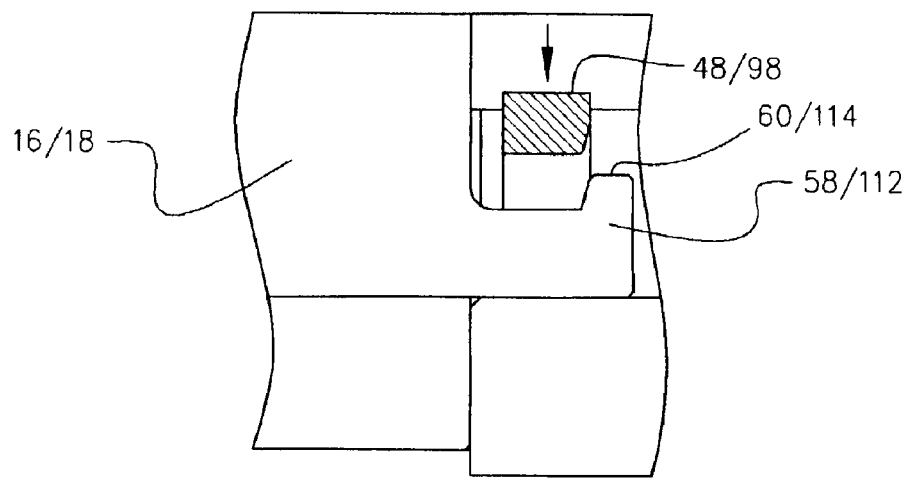
Figure 21C:
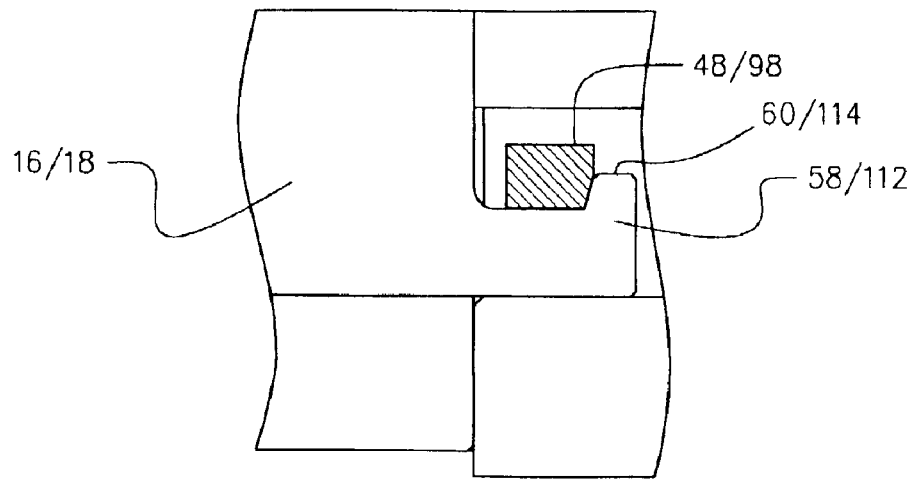

Referring to FIG. 5, the 3×6 static cavity mold housing 16 has a back plate 52 and leader pins 54 which protrude outwardly through the mold housing 16. The back plate 52 also has water flow lines 56 and the cavity mold housing 16 has a side yoke 58 which locks into the runner bar locking key yokes 48. The yoke 58 has a 5 degree angle on one surface 60 to allow a slide locking into the locking key yokes as shown in FIGS. 21A to 21C. The cavity mold housing 16 has a central opening 62 to which molten plastic flows via channel 64. The central opening 62 also has optional multiple pins 66 for forming openings in the plastic product being produced. The mold housing 16 also has a protrusion 65 and 67 used in engaging to the corresponding ejector cavity mold housing 18. The mold housing 16 is removably attached with screws to back plate 52. Therefore, the only portion of the molding system that needs to be changed for a different plastic product are the modules 16 and 18.

Figure 3:
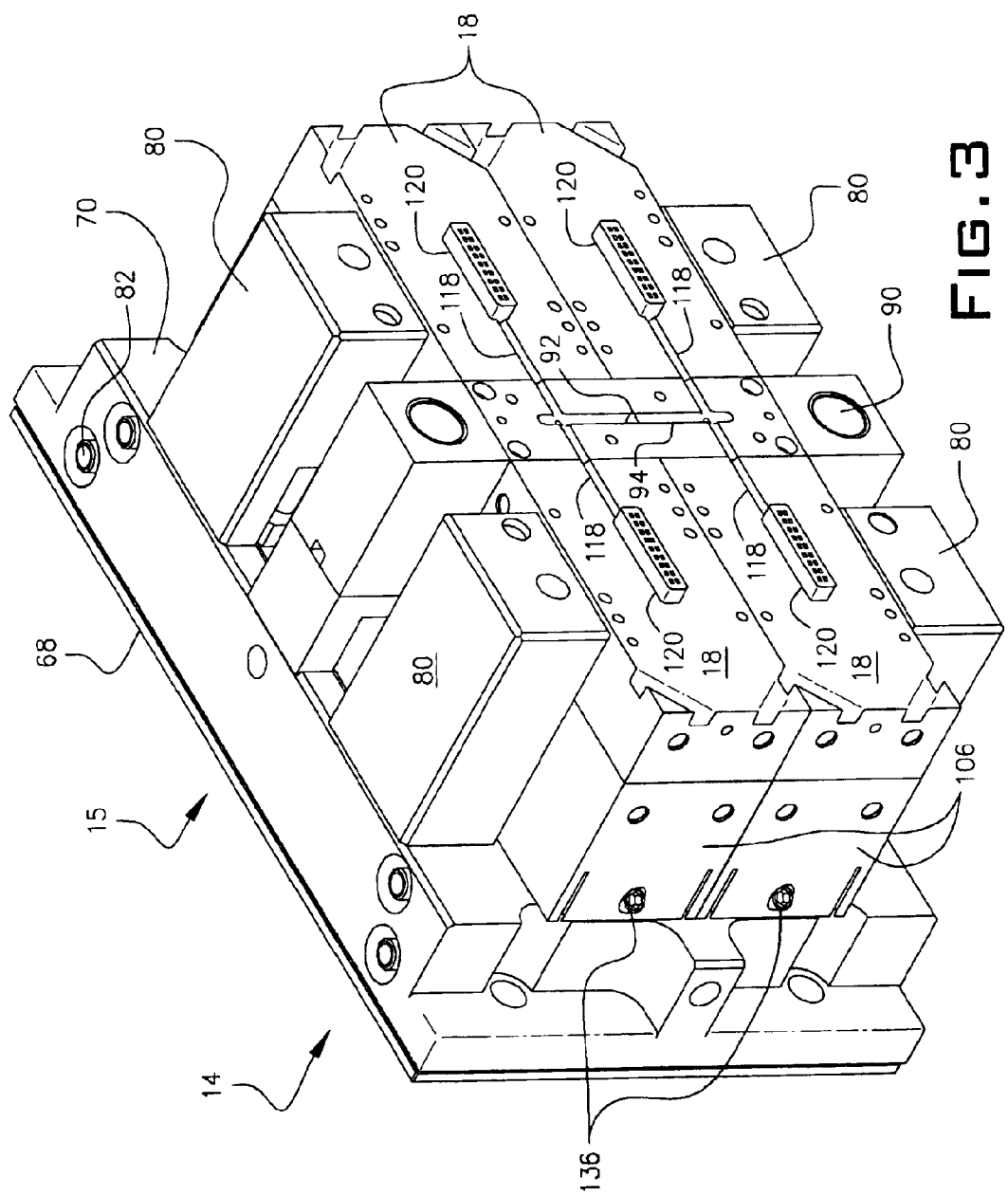
FIG. 3 is a perspective view of the ejector frame with four 3×6 ejector assemblies locked in position.
Figure 4:
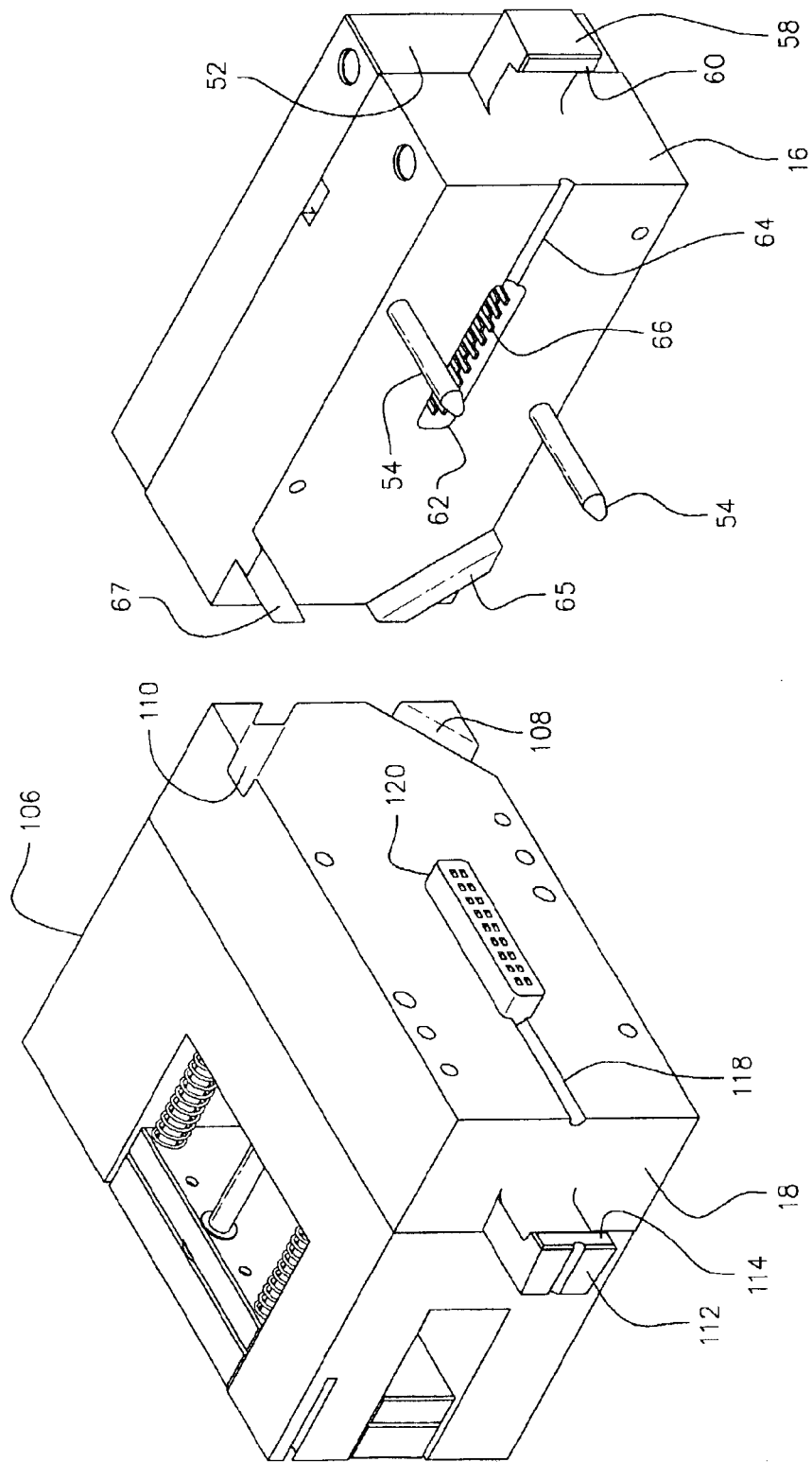
FIG. 4 is a perspective view of the static and the ejector 3×6 assemblies.
Figure 11:
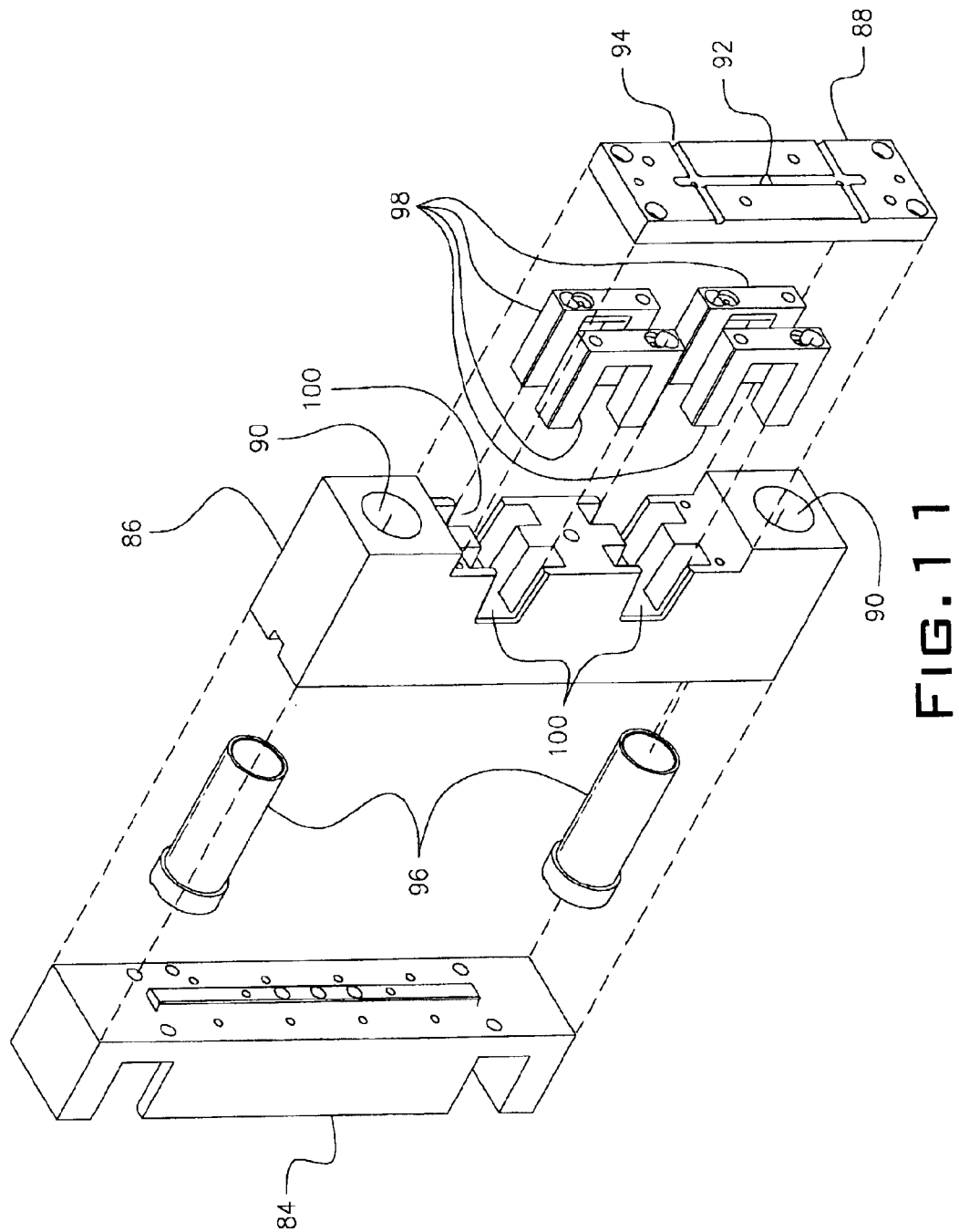
FIG. 11 is an exploded view showing the assembly of the front section of the ejector frame of the molding system.
Figure 12:
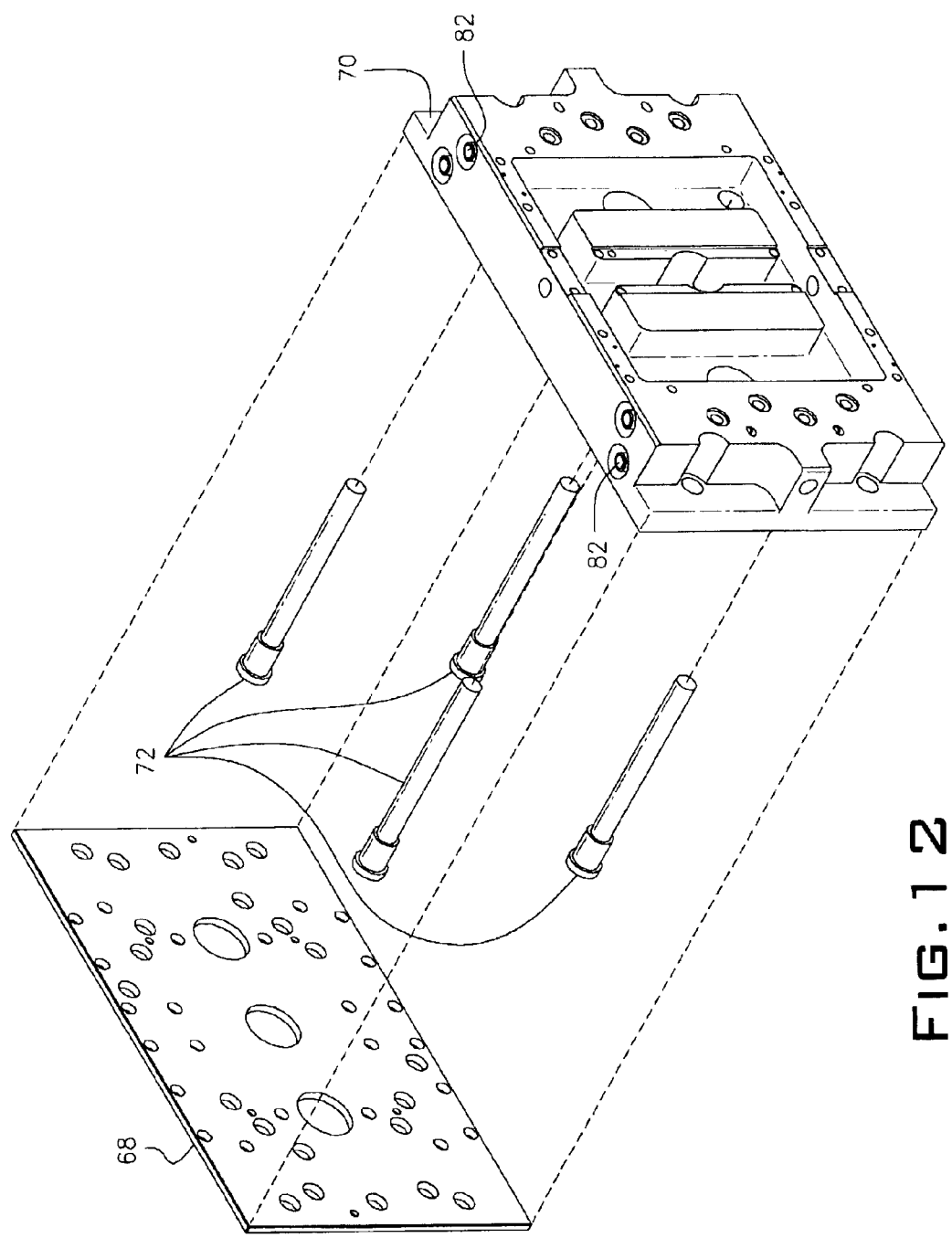
FIG. 12 is an exploded view showing the assembly of the back section of the ejector frame of the molding system.
Figure 13:
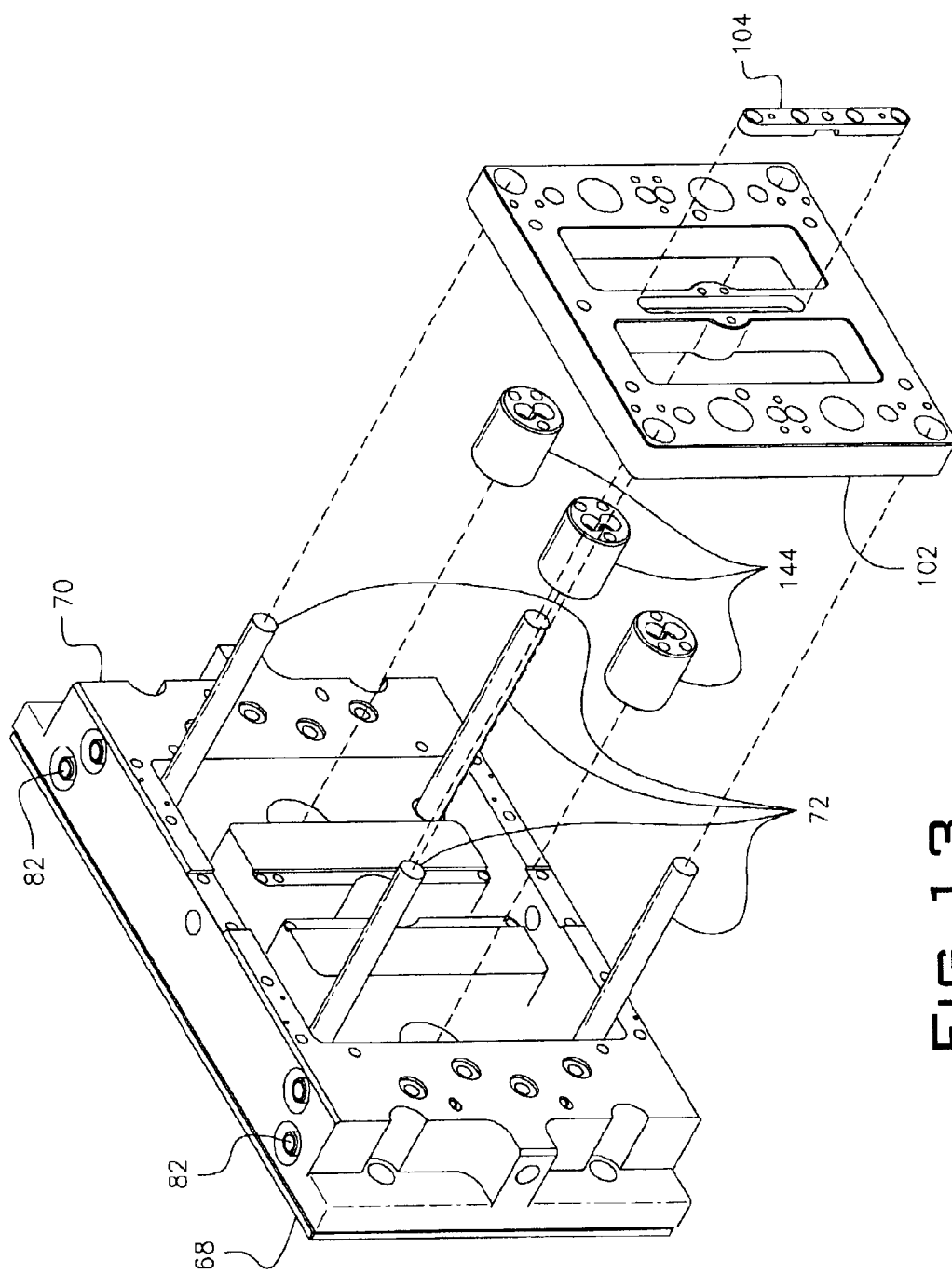
FIG. 13 is an exploded view showing the assembly of a first intermediate section of the ejector frame of the molding system.
Figure 14:
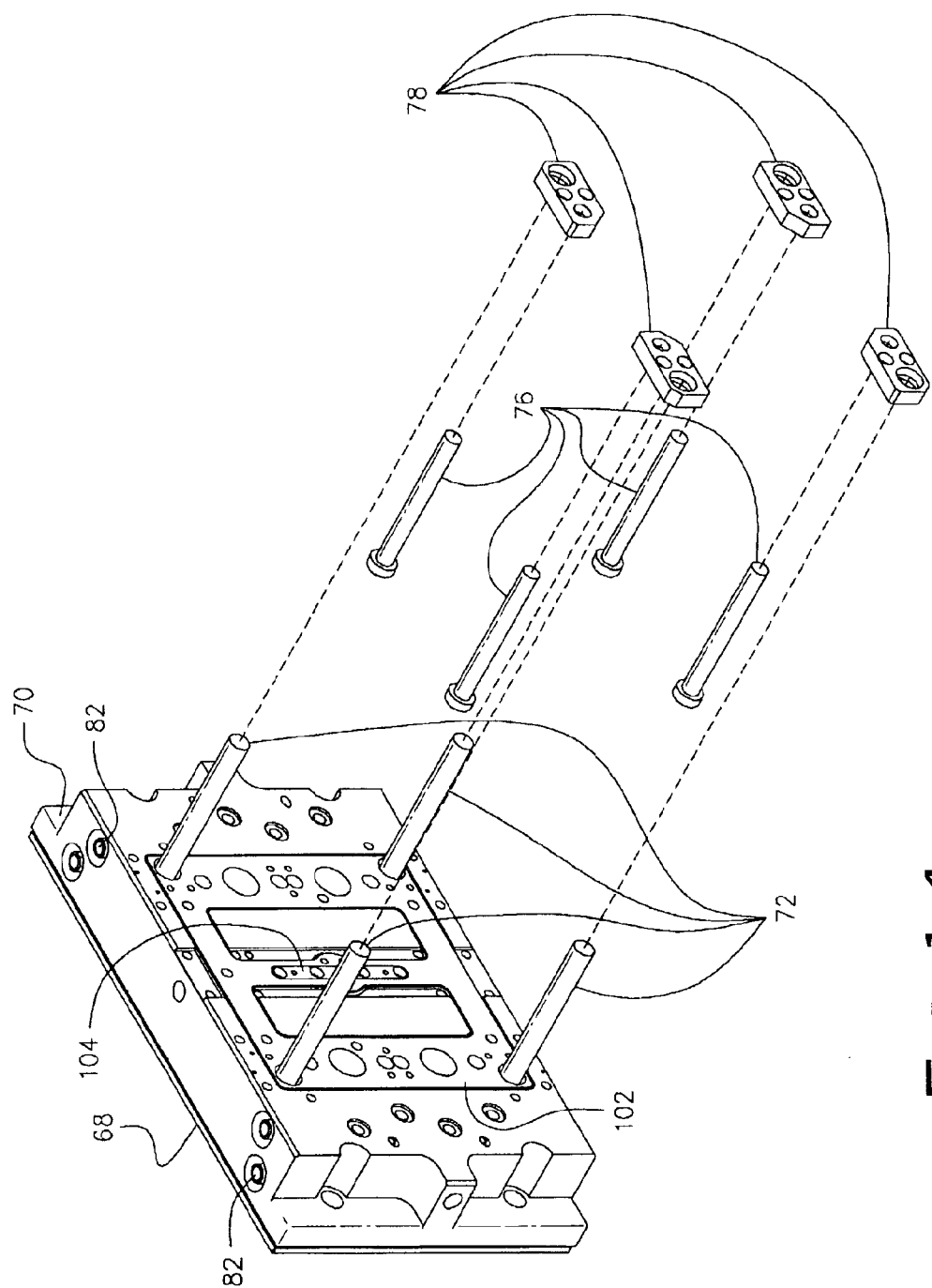
FIG. 14 is an exploded view showing the assembly of a second intermediate section of the ejector frame of the molding system.
Figure 15:
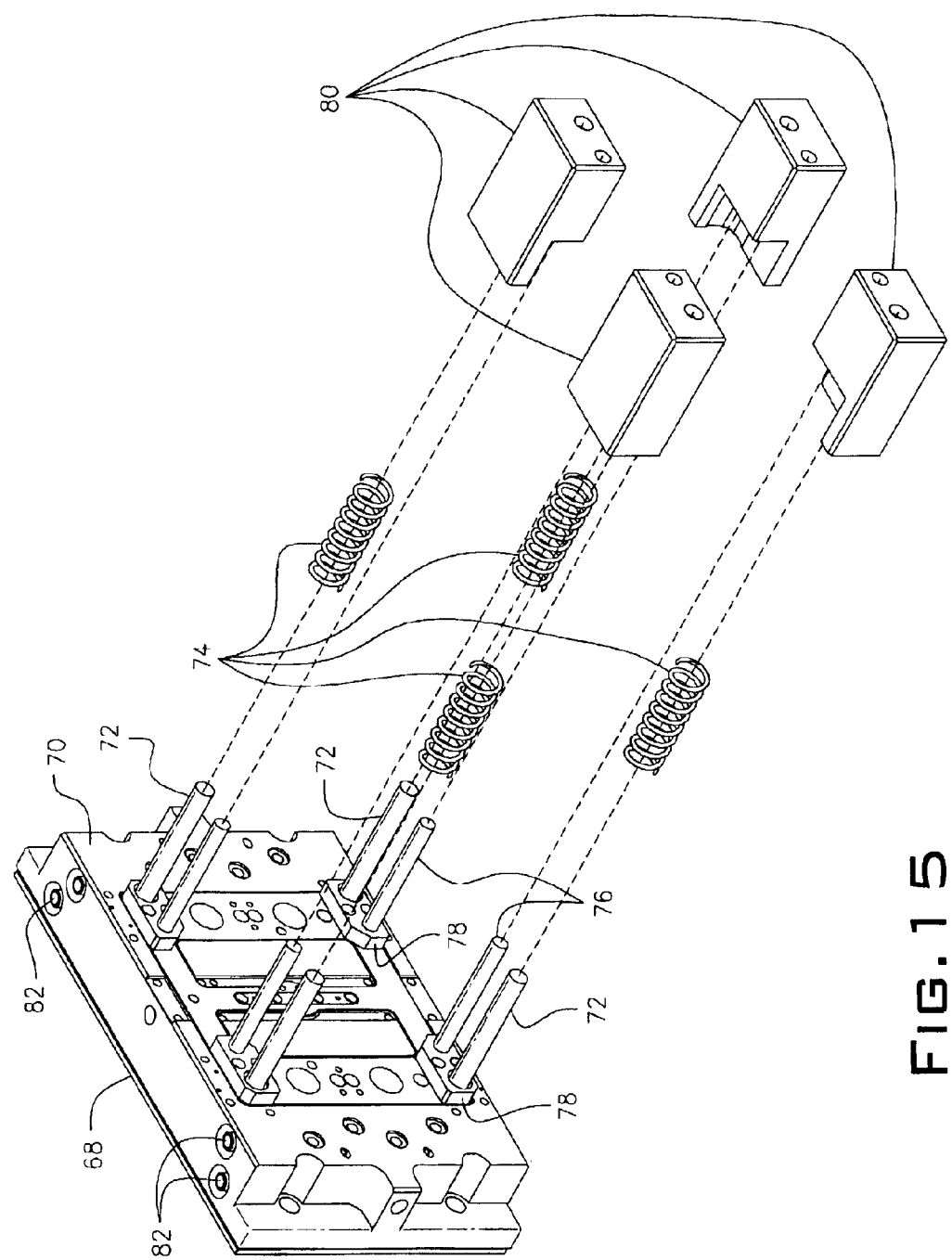
FIG. 15 is an exploded view showing the assembly of a third intermediate section of the ejector frame of the molding system.
Figure 16:
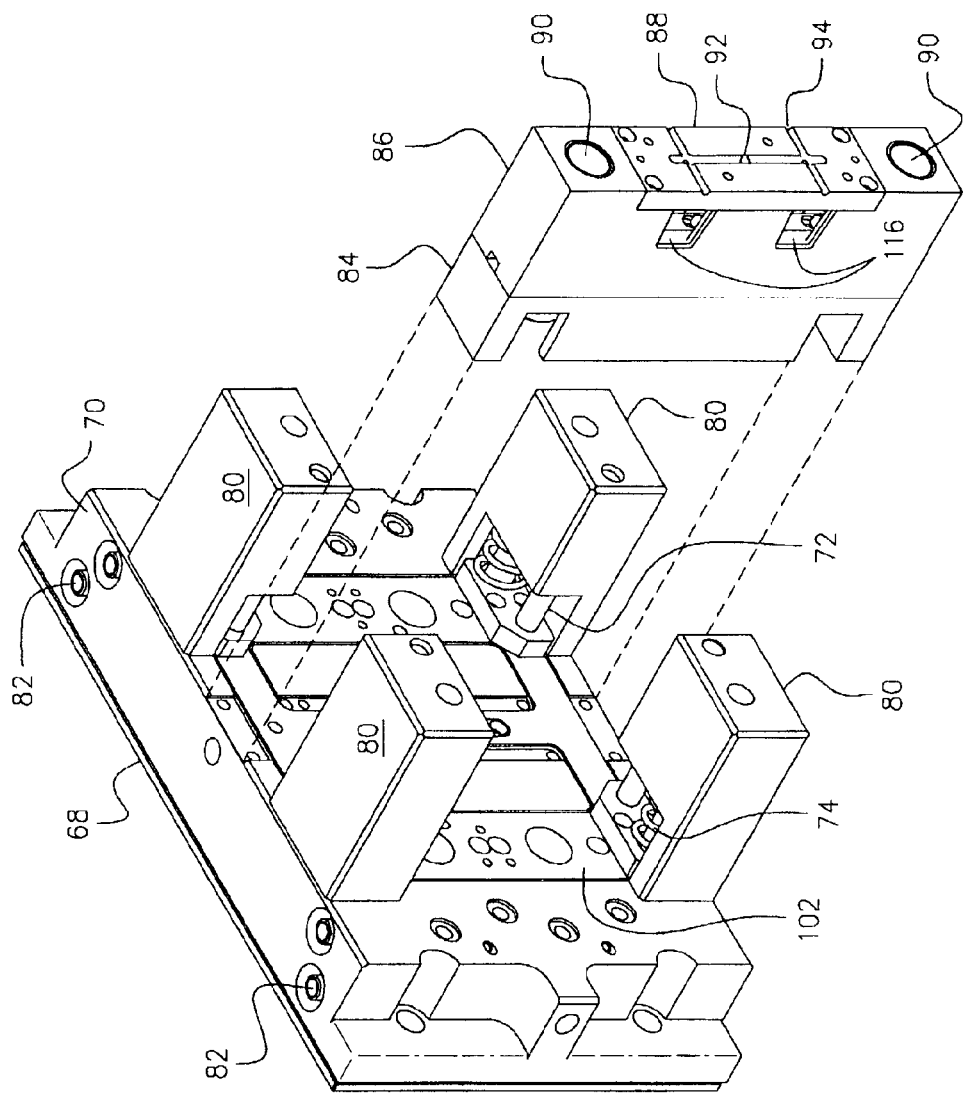
FIG. 16 is an exploded view showing the assembly of the front section shown in FIG. 11 to the back and intermediate portions shown in FIGS. 12–15 of the ejector frame.
Figure 17:
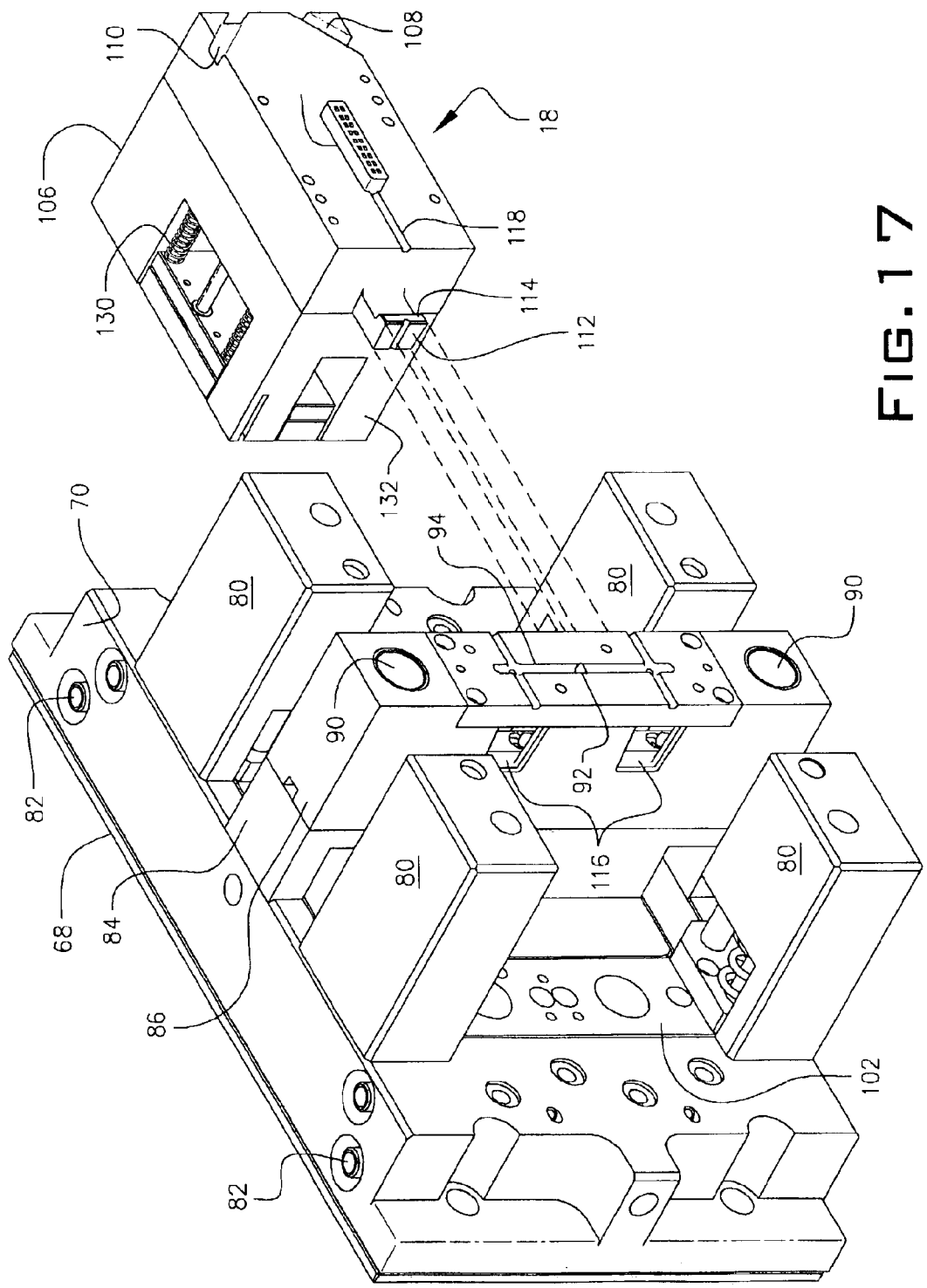
FIG. 17 is a perspective view of the ejector frame shown in FIG. 3 being loaded with an ejector mold assembly.

The ejector frame 14 shown in FIG. 3 has a bottom insulated plate 68 and a bottom clamp plate 70 as seen in FIG. 12. Attached to the bottom clamp plates 70, as shown in FIG. 15, are ejector guide pins 72 over which springs 74 are located. In addition, there are return pins 76 that are fitted on a back end to a return pin retainer 78. Four return pin housings 80 retain the ejector guide pin, return pin and a spring. The bottom clamp plate 70 has openings for the water lines 82. Also attached to the front of the bottom clamp plate is a runner support 84, runner bar 86 and a runner bar insert 88 located in front of the runner bar 86. In addition, bores 90 pass through the runner bar 86. These bores 90 receive the interlock pins 22 from the static frame 12. The bore 90 through the runner bar 86 contains an interlock pin bushing 96 as seen in FIG. 11. Locking key yokes 98 fit into slots 100 in the runner bar 86. At the back end of the ejector frame assembly is a bottom insulator plate 68 shown in FIG. 12. In front of the bottom clamp plate 70 is an ejector bar 102 with a front ejector insert 104 separated from clamp plate 70 by extension tubes 144, as seen in FIG. 13.

Figure 6:
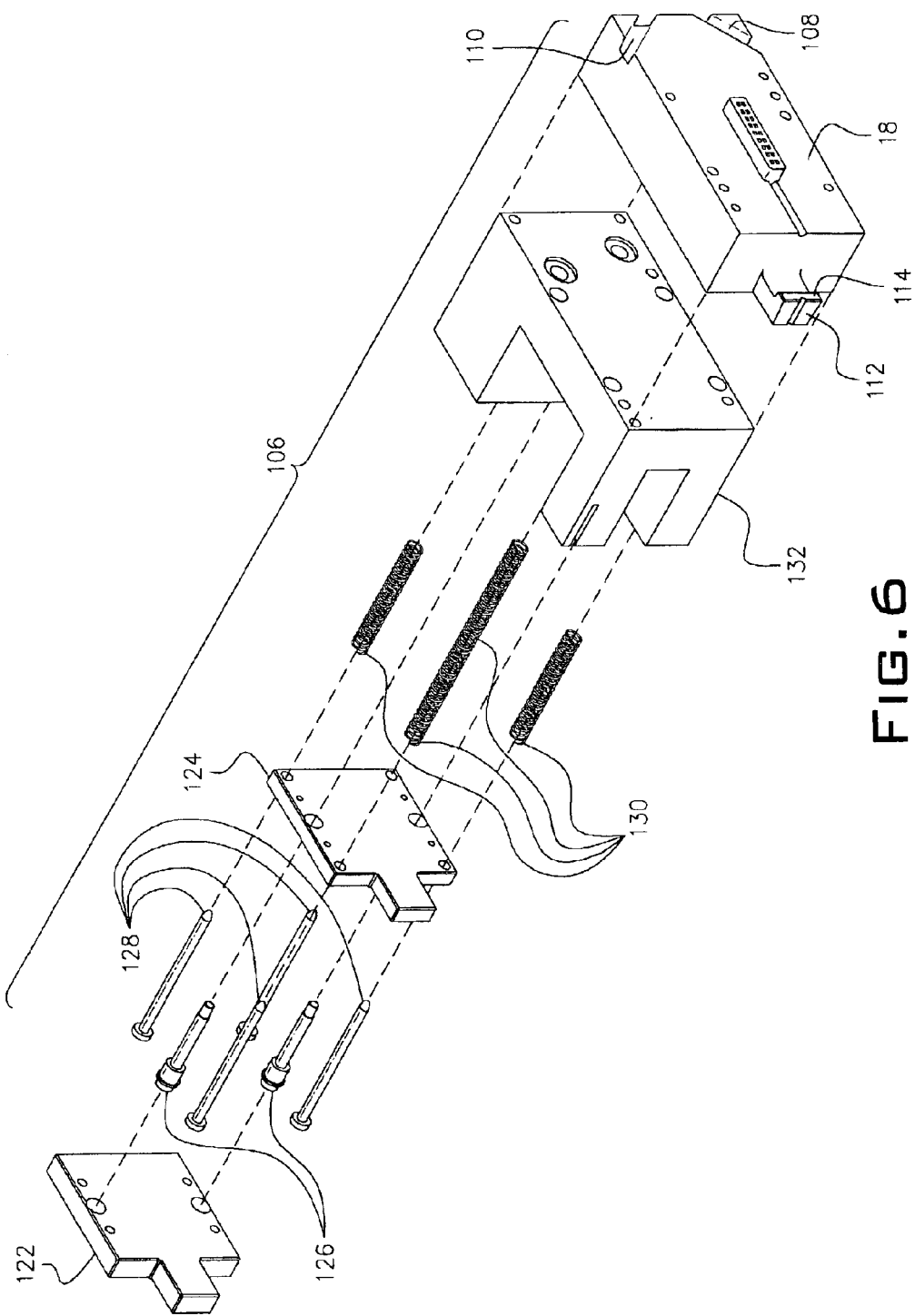
FIG. 6 is an exploded view showing the parts of the ejector mold assembly.

As shown in FIG. 6, the ejector back plate assembly 106 is attached by screws to the back end of the ejector cavity mold housing 18. Mold housing 18 has a slot 108 corresponding to protrusion 65 in the static cavity mold housing 16 and slot 110 corresponds to protrusion 67 in the static cavity mold housing 16. The ejector cavity mold module housing 18 has a yoke 112 with a surface 114 that is angled about 5 degrees to assist in locking to the locking key yokes 98.

Figure 10:
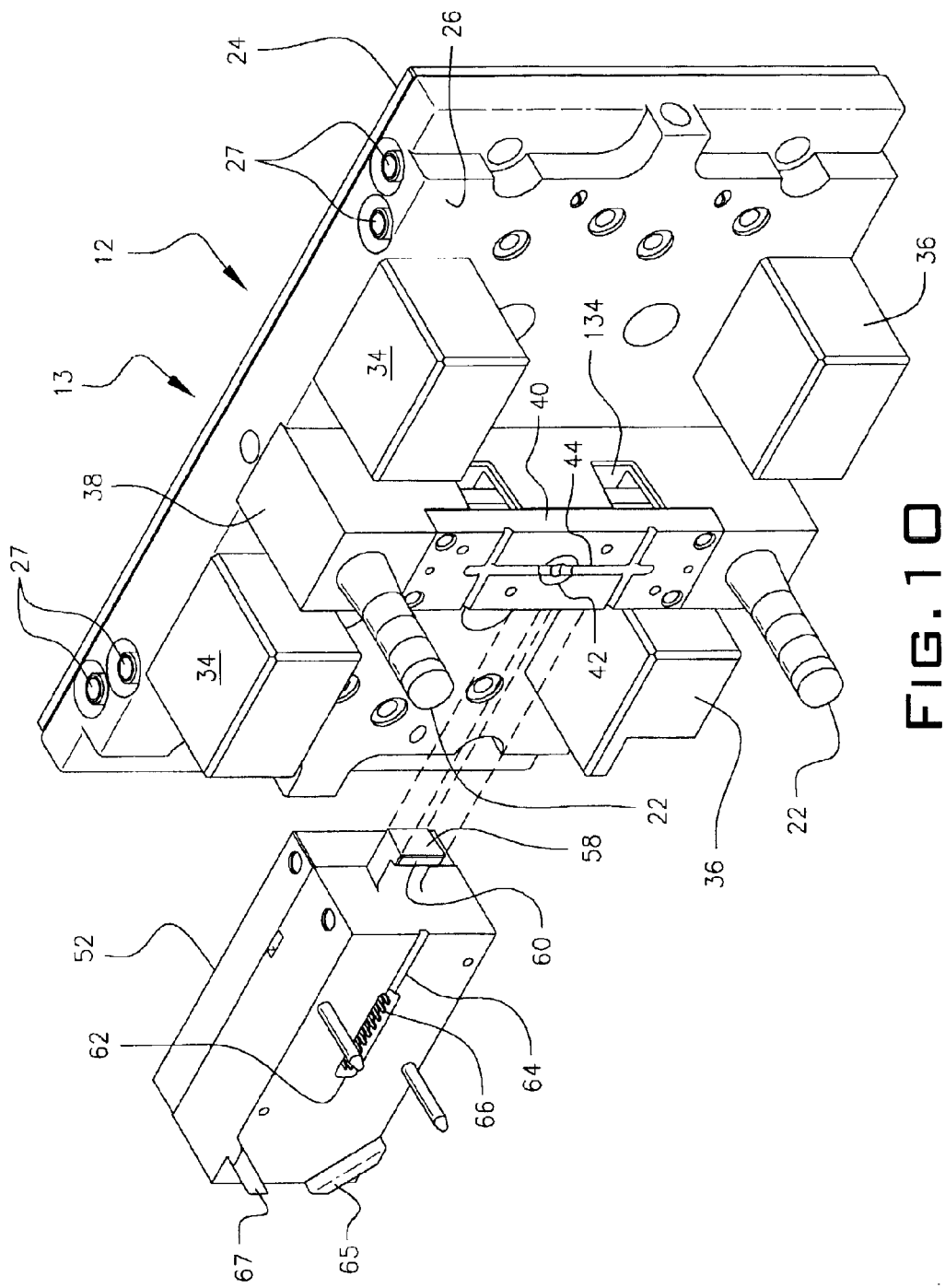
FIG. 10 is a perspective view of the static frame shown in FIG. 2 being loaded with a static mold assembly.

The ejector back plate assembly 106 shown in FIG. 6 is screwed to mold cavity housing 18. The back plate assembly 106 has an ejector plate 122 separated from a pin retainer plate 124 by shoulder bolts 126. Return pins 128 pass through retainer plate 124 and are enclosed by springs 130 engaged to support plate 132. The ejector back plate assembly 106 is removably attached to the ejector cavity mold module housing 18 which is attached by yoke 112 into key opening 116. In like manner, yoke 58 in the static cavity mold housing 16 removably attached to back plate 52 is attached into key opening 134 as shown in FIG. 10. Angled screws 136 attach each assembly to its respective frame.

Figure 18:
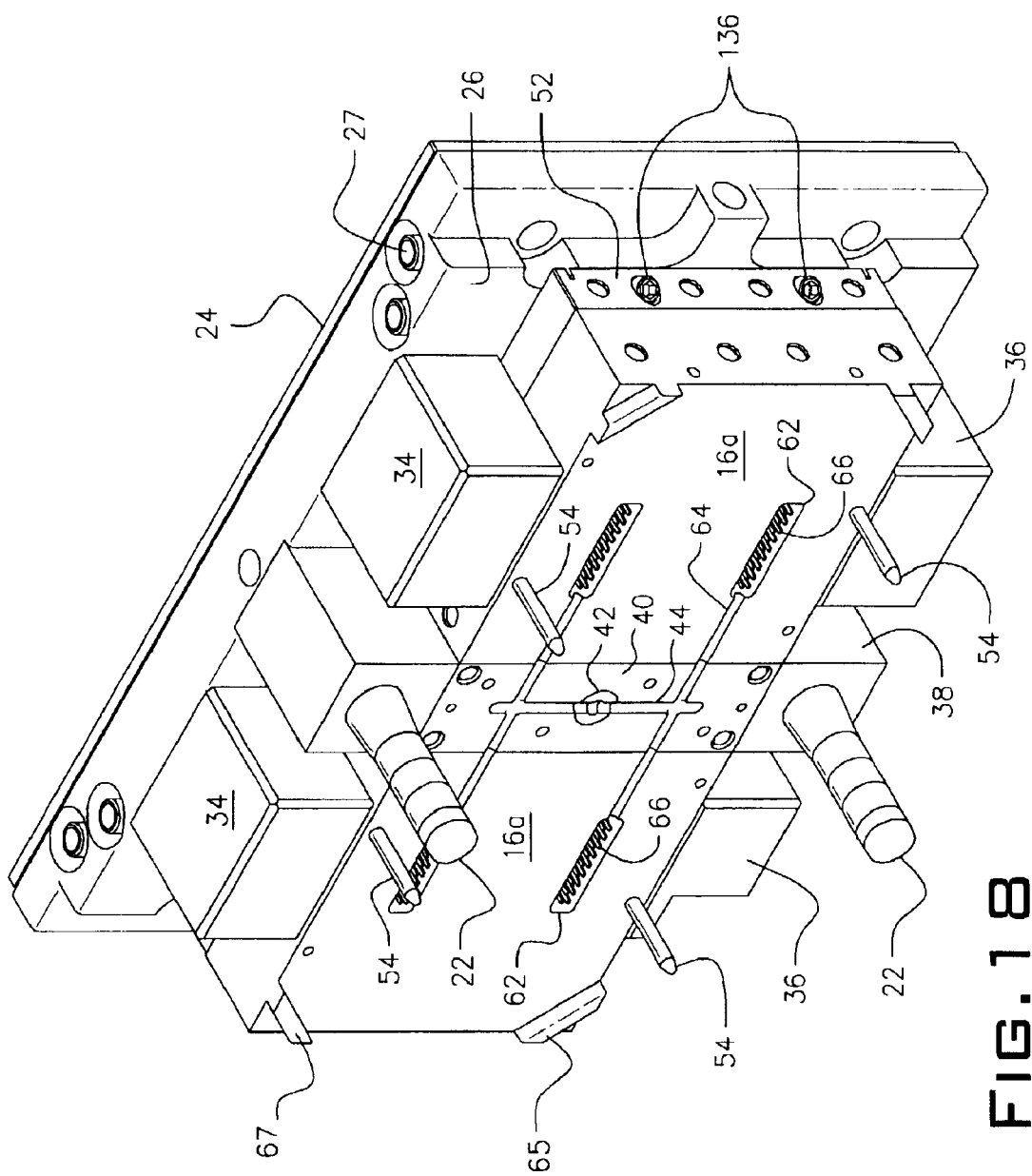
FIG. 18 is a perspective view of a static frame with two 6 ×6 static mold assemblies locked in position.
Figure 19:
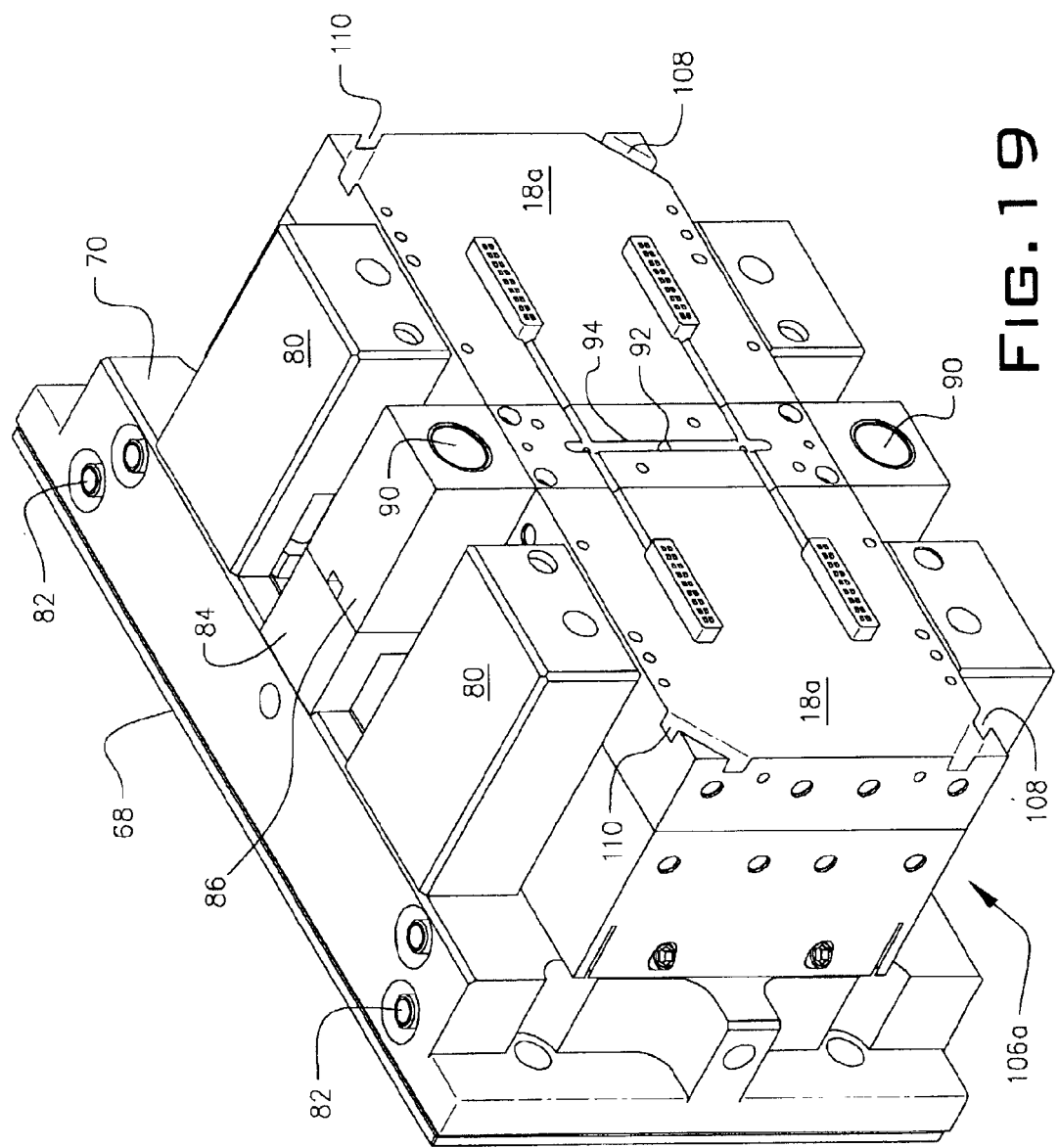
FIG. 19 is a perspective view of the ejector frame with two 6×6 ejector mold assemblies locked in position.
Figure 20:
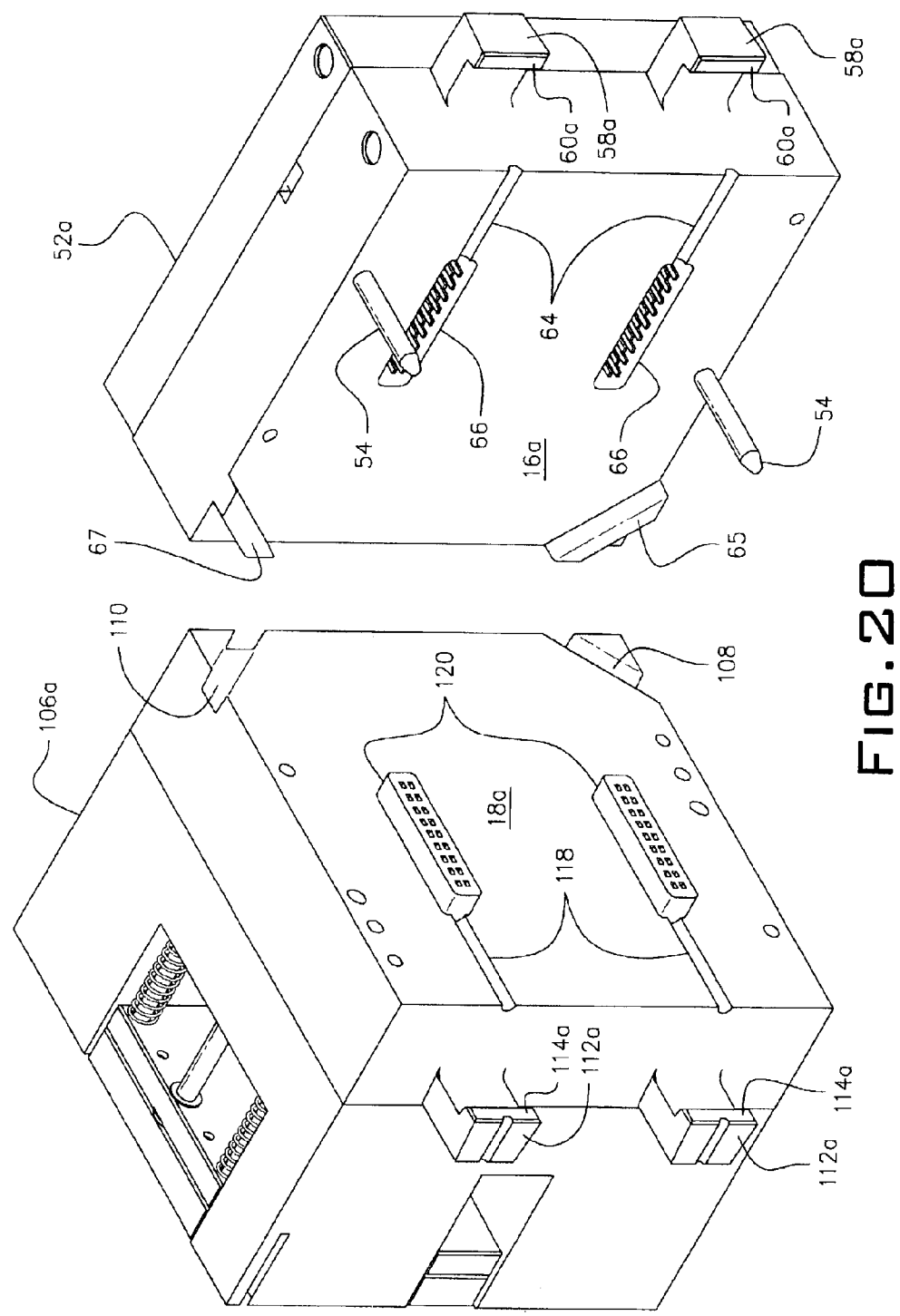
FIG. 20 is a perspective view of the static and the ejector 6×6 mold assemblies.

Using the system of this invention, a mold maker merely creates the proper mold cavities in the molds 16 and 18. No other component in the system needs to be changed. The system will work with four 3×6 molds as seen in FIGS. 2 and 3 or two 6×6 molds as seen in FIGS. 18 and 19. Using the 6×6 molds, the static back plate 52A is enlarged and the ejector back plate assembly 106A must be enlarged. The mold cavity housings 16A and 18A conform geometrically with back plate 52A and ejector back plate assembly 106A. A pair of key yokes 58A with top surface 60A are attached to one side of the 6×6 mold housings 16A and a pair of key yokes 112A with top surfaces 114A are attached to one side of the 6×6 mold housing 18A. Other mold housings of different sizes could be employed as long as they conform to the geometry of the frames 12 and 14.

The molten plastic flows through the sprue bushing 28 to the module mold housing via openings 42 and 92 in the runner bars and then via channels 44 and 94 respectively to channels 64 and 118 to cavities 62 and 120, respectively. The plastic is cooled by water flowing through water line tubes 27 and 82, and the desired component is then ejected and a next cycle begins.

Figure 22:
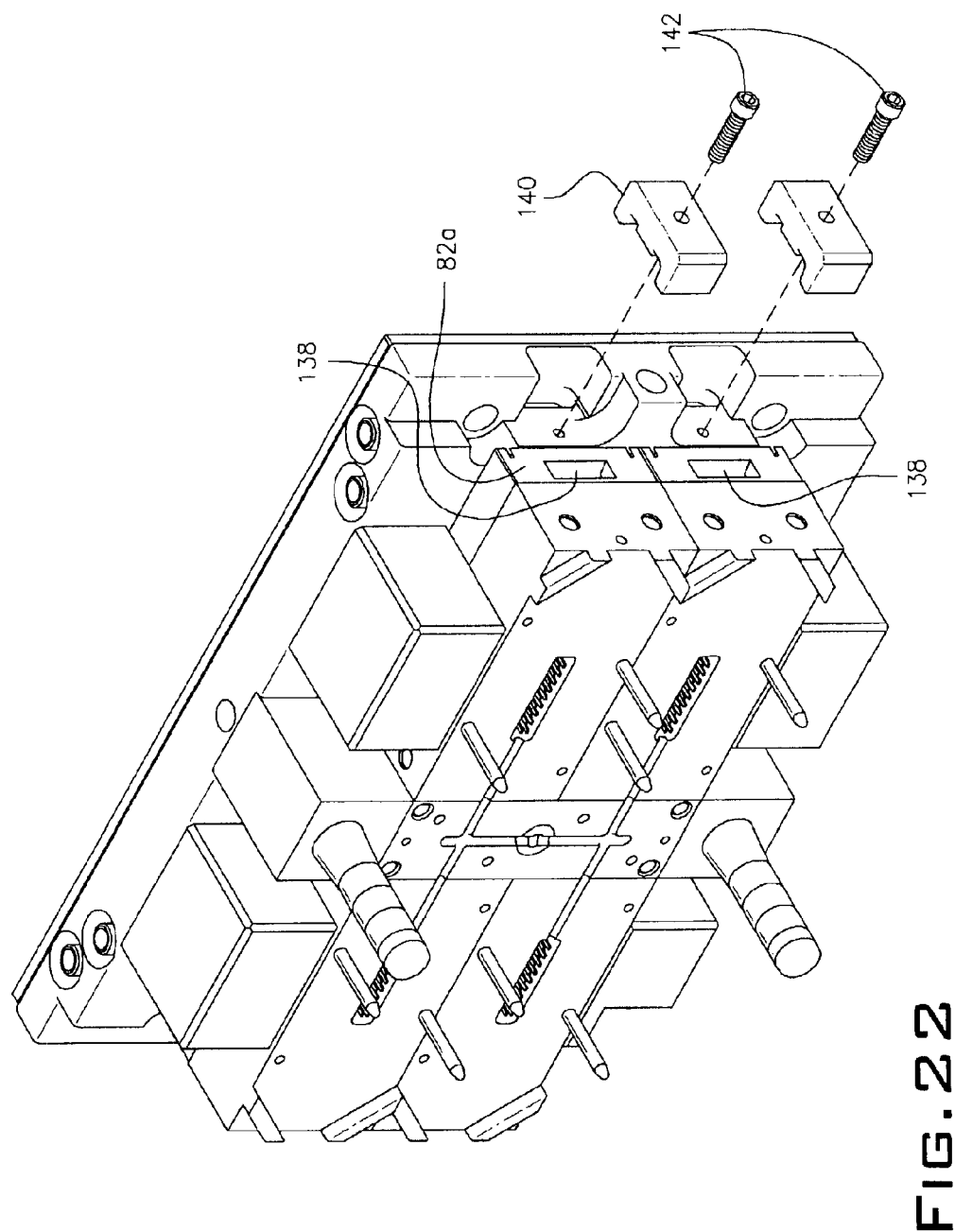
FIG. 22 is a perspective view of an alternate outside locking device for 3×6 static mold assemblies.
Figure 23:
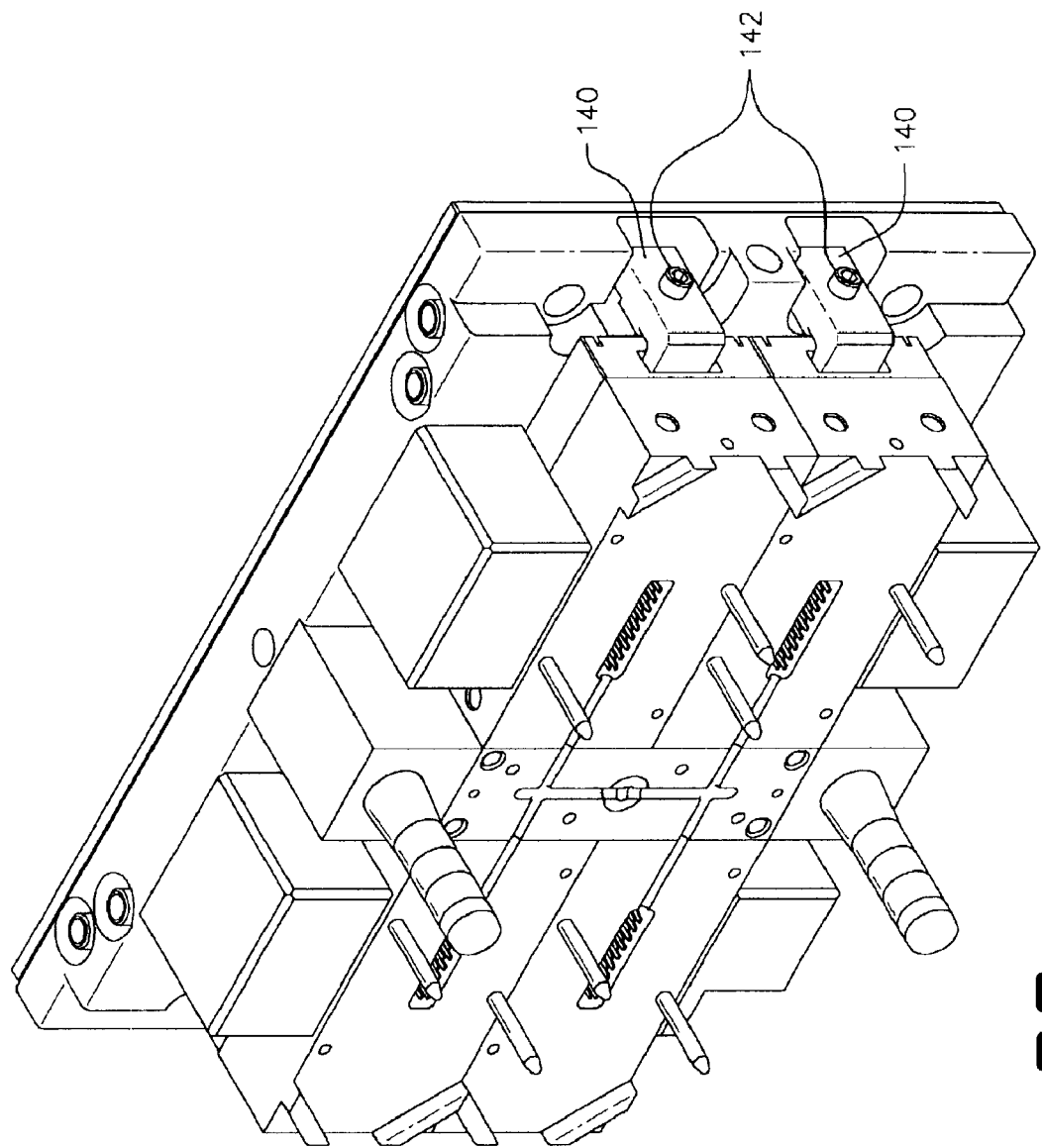
FIG. 23 is a perspective view of the locking device of FIG. 22 positioned in the locked mode.

Screws 136 on each side of the back plate 52 or support side assembly 106 hold the static and ejector mold assemblies in position to complete the molding system. Alternatively, as seen in FIGS. 22 and 23, the back plate 52A as well as the support plate 132 attached to the ejector cavity mold can have a side opening 138 in which one leg of a U-shaped clamp 140 is inserted to hold the back plate or support plate to the top or bottom clamp assembly, respectively. Screws 142 hold clamps 140 in place.

Equivalent elements can be substituted for the metallic components of the static and ejector frame to provide the same functional advantages and done in the same way.

Having disclosed the invention, what is claimed follows:

1. An injection molding press attached on opposed inside surfaces to a static and ejector frame, each frame supporting a mold assembly, the mold assembly comprising:

(a) on the static frame side, a static cavity mold housing containing on a front face a channel for receipt of a liquid polymer, the channel leading to a cavity for forming a portion of a plastic element, a back side of the static cavity mold housing removably attached to a back plate to form a static mold assembly;

(b) on the ejector frame side, an ejector cavity mold housing containing on a front face a channel for receipt of a liquid polymer, the channel leading to a cavity for forming a portion of a plastic element, a back side of the ejector cavity mold housing removably attached to an ejector back plate assembly to form an ejector mold assembly;

(c) the static cavity mold housing and ejector cavity mold housing adapted to be removed from the back plate and ejector back plate assembly, respectively and replaced with a substitute cavity mold housing of the same geometric configuration without change to any other component and without connection to a water cooling port;

(d) the static cavity mold housing and ejector cavity mold housing, each having a projecting angled yoke from a side surface engaging a slot in a runner bar at a front portion of the static frame side and ejector frame side, respectively so that the mold assemblies are inserted from a side of the injection molding press; and (e) the runner bar on the static frame having a pair of interlock pins projecting out of the front end, the ejector frame runner bar having a pair of bores passing therethrough for receipt of the interlock pins from the static frame.

2. The injection molding press according to claim 1, wherein there are four static mold assemblies attached to the static frame side and four ejector mold assemblies attached to the ejector frame side.

3. The injection molding press according to claim 1, wherein there are two static mold assemblies attached to the static frame side and two ejector mold assemblies attached to the ejector frame side.

4. The injection molding press according to claim 2, wherein the four static mold assemblies and four ejector mold assemblies are rectangular in shape.

5. The injection molding press according to claim 3, wherein the two static mold assemblies and two ejector mold assemblies are square in shape.

6. The injection molding press according to claim 1 wherein each back plate and each ejector back plate assembly has a slot on a side surface opposed to the side surface of the static and ejector mold housing containing the yoke, the slot receiving one leg of a U-shaped clamp with a second leg received within a slot on the corresponding static and ejector frame respectively to hold an outboard side of the static and ejector mold assemblies in place.

7. In an injection molding press attached on opposed inside surfaces to a static and ejector frame, each frame supporting a mold assembly, the improvement comprising:
   (a) on the static frame side, a static cavity mold housing containing on a front face a channel for receipt of a liquid polymer, the channel leading to a cavity for forming a portion of a plastic element, a back side of the static cavity mold housing removably attached to a back plate to form a static mold assembly;
   (b) on the ejector frame side, an ejector cavity mold housing containing on a front face a channel for receipt of a liquid polymer, the channel leading to a cavity for forming a portion of a plastic element, a back side of the ejector cavity mold housing removably attached to an ejector back plate assembly to form an ejector mold assembly;
   (c) the static cavity mold housing and ejector cavity mold housing adapted to be removed from the back plate and ejector back plate assembly, respectively and replaced with a substitute cavity mold housing of the same geometric configuration without change of any other component and without connection to a water cooling port;
   (d) the static cavity mold housing and ejector cavity mold housing each having a projecting angled yoke from a side surface engaging a slot in a runner bar at a front portion of the static frame side and ejector frame side, respectively so that the mold assemblies can be inserted from a side of the injection molding press; and
   (e) the runner bar on the static frame having a pair of interlock pins projecting out of the front end, the ejector frame runner bar having pair of bores passing therethrough for receipt of the interlock pins from the static frame.

8. The improved injection molding press according to claim 7, wherein there are four static mold assemblies attached to the static frame side and four ejector mold assemblies attached to the ejector frame side.

9. The improved injection molding press according to claim 7, wherein there are two static mold assemblies attached to the static frame side and two ejector mold assemblies attached to the ejector frame side.

10. A system for manufacturing plastic components in an injection molding press having attached on opposed inside surfaces of the molding press a static frame and an ejector frame, the static frame attached to a static mold assembly and the ejector frame attached to an ejector mold assembly, the system further comprising:
    (a) in the static assembly, a static mold containing on a front face a channel for receipt of a liquid polymer, the channel leading to a cavity for forming a portion of the plastic component, a back side of the static cavity mold housing removably attached to a back plate to form the static assembly;
    (b) in the ejector frame assembly, an ejector cavity mold housing containing on a front face a channel for receipt of a liquid polymer, the channel leading to a cavity for forming a portion of a plastic element, a back side of the ejector cavity mold housing removably attached to an ejector back plate assembly to form a ejector mold assembly;
    (c) the static cavity mold housing and ejector cavity mold housing adapted to be removed from the back plate and ejector back plate assembly, respectively and replaced with a cavity mold housing free of connection to a water cooling port and for a different plastic component;
    (d) the static cavity mold housing and ejector cavity mold housing each having a projecting angled yoke from a side surface engaging a slot in a runner bar at a front portion of the static frame side and ejector frame side, respectively so that the mold housings can be inserted from a side of the injection molding press; and
    (e) the runner bar on the static frame having a pair of interlock pins projecting out of the front end, the ejector frame runner bar having a pair of bores passing therethrough for receipt of the interlock pins from the static frame.

11. The system for manufacturing plastic components according to claim 10 wherein there are four static mold assemblies attached to the static frame side and four corresponding ejector mold assemblies attached to the ejector frame side.

12. The system for manufacturing plastic components according to claim 10 wherein there are two static mold assemblies attached to the static frame side and two ejector mold assemblies attached to the ejector frame side.

13. The system for manufacturing plastic components according to claim 11 wherein the four static mold assemblies and four ejector mold assemblies are rectangular in shape.

14. The system for manufacturing plastic components according to claim 12 wherein the two static mold assemblies and two ejector mold assemblies are square in shape.

15. The system for manufacturing plastic components according to claim 10 wherein each back plate and each back plate assembly has a bore on a side surface of the static and ejector mold housing containing a screw engaging at an angle a portion of the static frame and ejector frame, respectively.

16. The system for manufacturing plastic components according to claim 10 wherein each back plate and each ejector back plate assembly has a slot on a side surface opposed to the side surface of the static and ejector mold housing containing the yoke, the slot receiving one leg of a U-shaped clamp with a second leg received within a slot on the corresponding static and ejector frame, respectively to hold an outboard side of the static and ejector mold assemblies in place.

\* \* \* \* \*